United States Patent [19]
Uchiyama

[11] Patent Number: 5,439,568
[45] Date of Patent: Aug. 8, 1995

[54] METHOD FOR TREATING OZONE LAYER DEPLETING SUBSTANCES

[75] Inventor: Hiroshi Uchiyama, Hirakata, Japan

[73] Assignees: E. C. Chemical Co., Ltd., Osaka; Itochu Fine Chemical Corporation, Tokyo, all of Japan

[21] Appl. No.: 163,077

[22] Filed: Dec. 8, 1993

[30] Foreign Application Priority Data

Dec. 18, 1992 [JP] Japan ................................ 4-339198

[51] Int. Cl.$^6$ ............................................. H05F 3/00
[52] U.S. Cl. .................................. 204/164; 588/210; 588/212; 588/227
[58] Field of Search .................. 588/212, 227, 210; 204/164

[56] References Cited

U.S. PATENT DOCUMENTS 5,026,464  6/1991  Mizuno et al. .................... 204/164

FOREIGN PATENT DOCUMENTS 0467639  1/1992  European Pat. Off. .
2640148  6/1990  France .
279179  10/1992  Japan .

OTHER PUBLICATIONS

CA 116:90262 (1991).
CA 118:66184 (1992)—same as JP 04-279,179 listed above.
Patent Abstracts of Japan, vol. 017, No. 079 (C-1027) 17 Feb. 1993 & JP-A-42 079 179 (Touwa Kagaku) 5 Oct. 1992.
Chemical Abstracts, vol. 118, No. 12, 1992, Columbus, Ohio, US; abstract No. 108961h, Sekiguchi 'Thermal plasma decomposition of chlorofluorocarbons' abstract, & Koon Gakkaishi, vol. 18, No. 5, 1992.

*Primary Examiner*—Kishor Mayekar
*Attorney, Agent, or Firm*—Sherman and Shalloway

[57] ABSTRACT

A method for treating ozone layer depleting substances, in which a gaseous composition comprising helium or argon or a mixture thereof, or a gaseous mixture of argon and acetone, is introduced into a plasma reactor having a dielectric-coated electrode comprising a solid dielectric disposed on the surface of at least one of opposing electrodes, an atmospheric pressure glow discharge is generated in the gaseous atmosphere, gaseous ozone layer depleting substances are introduced into the glow discharge to decompose the substances, and resulting decomposition products are absorbed in water.

10 Claims, 2 Drawing Sheets

METHOD FOR TREATING OZONE LAYER DEPLETING SUBSTANCES

FIELD OF THE INVENTION

This invention relates to a method for treating substances which are destructive to the earth's ozone layer, more specifically, to a method for treating chlorofluorocarbon (CFC) compounds.

DESCRIPTION OF PRIOR ART

Presently, ozone layer depleting substances are considered to include mainly CFC compounds, and thus they are called to be fully disused by 1995. However, at present, CFC compounds are used in a variety of applications such as car coolers and refrigerators, and the compounds must therefore be recovered and made harmless. In particular, specific CFCs which have chlorine in the molecule such as those of monofluoromethane (R-11), difluoromethane (R-12), trifluorotrichloroethane (R-113), tetrafluorodichloroethane (R-114), pentafluoromonochloroethane (R-115), and tetrafluoroethane (CFC-134) are difficult to be decomposed.

Recently, a method has been proposed as a means for decomposing CFC compounds, in which the compounds are decomposed by a high-temperature plasma at 10,000° C. However, this method requires generation of a very high temperature of 10,000° C., and involves problems which have yet to be solved before practical application in view of the treatment apparatus and treatment cost.

On the other hand, the inventors have proposed previously a method in which glow discharge is generated in a mixture of argon and helium or a mixture of argon and a ketone under atmospheric pressure to excite a plasma, which makes the surface of substances hydrophilic or hydrophobic (Japanese Patent Publication Laid-open 3-23475, U.S. Pat. No. 5,124,173).

OBJECT OF THE INVENTION

The inventors have intensively studied on means for decomposing gaseous ozone layer depleting substances, especially CFC compounds to be harmless, and found that the CFC compounds can be efficiently decomposed by an atmospheric pressure plasma which the inventors previously invented, accomplishing the present invention. Therefore, a primary object of the present invention is to provide a method for decomposing ozone layer depleting substances, especially CFC compounds containing chlorine which are perfectly gaseous at normal temperature and pressure, or under an increased or reduced pressure close to atmospheric pressure into hydrogen chloride and hydrogen fluoride, which are absorbed in water, that is, to provide a method for decomposing ozone layer depleting substances containing chlorine, especially CFC compounds, which is also economically advantageous.

SUMMARY OF THE INVENTION

In accordance with the present invention, there is provided a method in which a gaseous composition comprising helium or argon or a mixture thereof, or a mixture of argon and acetone, is introduced into a plasma reactor having a dielectric-coated electrode comprising a solid dielectric disposed on the surface of at least one of opposing electrodes, an atmospheric pressure glow discharge is generated in the gaseous atmosphere, gaseous ozone layer depleting substances are introduced into the glow discharge to decompose the substances, and resulting decomposition products are absorbed in water.

In the present invention, as in the atmospheric pressure plasma treatment method invented by the inventors, an atmospheric pressure glow discharge is generated in an inert gas such as helium, argon, argon and a ketone, or nitrogen, gaseous ozone layer depleting substances, especially, CFC compounds in the state of gas or vapor are introduced in the glow discharge to be decomposed, hydrogen chloride and hydrogen fluoride produced by decomposition are absorbed in water and disposed of as hydrochloric acid and hydrofluoric acid, and the inert gas such as helium, argon, argon and ketone, or nitrogen is reused for glow discharge generation. Thus, the present invention provides a method for decomposing gaseous ozone layer depleting substances, especially CFC compounds, which is very economical and practical, in which gaseous ozone layer depleting substances such as CFC compounds, especially those CFC compounds containing chlorine are decomposed, and the decomposition products are absorbed in water, or in an aqueous acid solution.

The present invention will now be described in detail.

Gaseous ozone layer depleting substances in the present invention are those compounds which are destructive to the ozone layer, especially CFC compounds containing chlorine. Specifically, these compounds include monofluoromethane (R-11), difluoromethane (R-12), trifluorotrichloroethane (R-113), tetrafluorodichloroethane (R-114), pentafluoromonochloroethane (R-115), tetrafluoroethane (CFC-134), and the like. Furthermore, the present invention can also treat those compounds which are out of the regulation but are considered to be destructive to the ozone layer such as trifluoromethane (R-3), monofluoropentachloroethane (R-111), and monofluoropentachloropropane (R-211), and ozone layer depleting substances other than CFC compounds such as 1,1,1-trichloroethane and perchloroethylene.

In the treat, merit of these gaseous compounds, the compounds or their vapors are introduced into an atmospheric pressure plasma generation apparatus. Depending on the size of the apparatus, the rate of introduction is preferably 200 cc to 1,000 co/min as vapors of the compounds for an apparatus shown in the embodiment.

Plasma generation conditions in the atmospheric plasma generation apparatus will be described.

As a power supply for generating a glow discharge, a frequency of 50 Hz to 100 KHz, or 13.56 MHz which is approved to be used other than broadcast frequencies, can be used. Of these frequencies, 200 Hz to 50 kHz is preferable to achieve a temperature lower than 100° C. close to room temperature, and 3 KHz to 10 KHz is the best for 30° to 60° C. and room temperature.

Furthermore, depending on the type of gas and the gap between the electrodes, the voltage is normally 1,000 to 8,000 V.

To generate an atmospheric pressure plasma, it is necessary to generate glow discharge in the apparatus in the presence of an inert gas such as helium, argon, or a mixture of argon and a ketone. For an argon atmosphere, it is necessary to add a small amount of ketone vapor but, for decomposing 1,1,1-trichloroethane, stable glow discharge can be generated without the addition of ketone, and trichloroethane is decomposed to a water-soluble substance such as hydrochloric acid. In this case, even with trichloroethane added to argon gas in an amount of several ppm to 15%, the glow discharge continues stably, and it is unnecessary to add a gas for facilitating glow discharge generation such as a ketone or helium which has heretofore been indispensable for generating glow discharge in argon.

Furthermore, for 1,1,1-trichloroethane, it is not clear why the glow discharge generation is facilitated, but for CFC R-1115, which has similar boiling temperature, no discharge is generated when it is added to argon alone, and the substance is not decomposed. Therefore, for CFC R-113, it is necessary to use helium as in the embodiment, or a mixture of argon and helium or argon and a ketone.

Decomposition products resulting from the decomposition by the atmospheric pressure plasma are absorbed in water. That is, the decomposition products are mainly fluorine compounds or chlorine compounds which are readily absorbed in water to form hydrochloric acid or hydrofluoric acid. These acids are dissolved in water, removed in the form of sodium salts, undecomposed gas is contained in an atmospheric pressure tank, and recirculated in the glow discharge for reuse.

A number of glow discharge tubes can be connected in series to completely remove residual fluorine compounds and chlorine compounds, providing a very economical method.

Then, an apparatus for carrying out the present invention will be described with reference to the drawings.

FIG. 1 is a schematic view of an atmospheric pressure plasma generation apparatus used in the present invention, FIG. 2 is a schematic vertical cross sectional view of the apparatus, and FIG. 3 is a schematic view for explaining the treatment method according to the present invention. FIG. 4 is a schematic side view of an example of an electrode used in the present invention, and FIG. 5 is a schematic perspective view of another example of an atmospheric pressure plasma generation apparatus used in the present invention.

Referring to FIG. 1, a metal thin plate 2 is wound around the outside of a glass-made cylindrical tube 1 to form one electrode. A metal rod 3 is positioned on the center line of the cylinder of the glass-made cylindrical tube 1 to form the other electrode, and the individual electrodes are provided with connection terminals 6 and 7, respectively. T-formed glass tubes 4 and 5 are engaged with both ends of the glass-made cylindrical tube 1, one of which is used as a gas inlet port and the other is used as a gas outlet. A port which is on the center line of the glass-made cylindrical tube 1 is used as a support of the metal rod, the port is closed, and the other port is connected to the plasma generation apparatus.

In the apparatus of the above construction, when a high voltage is applied to both electrodes, the glass of the glass-made cylindrical tube 1 functions as a dielectric and, as shown in FIG. 2, glow discharge is generated in the cylinder. Examples of the conditions for generating glow discharge are as follows: As shown by the arrow in FIG. 1, helium gas is introduced from one port of the T-formed tube 4 and discharged from one port of the T-formed tube 5, and a voltage of 3 KHz, 2,500 V is applied between the metal thin plate 1 and the metal rod 3. As a result, glow discharge is generated in the cylinder to form a plasma. In this case, the current was 30 mA and the output was 80 W.

In the present invention, the reactor tube inside is under an increased pressure or reduced pressure close to atmospheric pressure. When a gas is introduced from a gas inlet port 4 in FIG. 3, the cylinder inside is under an increased pressure due to a resistance during passage of the gas through a water absorption vessel or, when the gas is introduced from the port 4 under suction by a pump from the gas outlet port 8 as shown by the arrow in FIG. 3, the cylinder inside is under a reduced pressure. Glow discharge is generated at a lower pressure but, in the present invention, rather than a vacuum, the reduced pressure means a pressure close to atmospheric pressure up to 500 torr where the atmospheric pressure is 760 torr.

As an example of electrode used in the above apparatus, it is preferable to use a belt-formed metal thin plate wound around the outside of the glass cylinder as shown in FIG. 4 because glow discharge in the glass tube is well visible.

Since the above apparatus is an example, and the introduction of CFC into glow discharge is a means for decomposition, vertical electrodes as shown in FIG. 5 or electrodes covered by a number of dielectrics in a large vessel as in a Cottrell precipitator can also be used, rather than a cylinder.

Furthermore, since glass is easily corrected by hydrogen fluoride and is short in service life, an acid-resistant resin such as polyester, ABS, methacrylic, polyimide, AS, or fluororesin may be used. These resins are good dielectrics.

DESCRIPTION OF PREFERRED EMBODIMENTS

Embodiments of decomposing vapors of CFC solvents using the above apparatus will now be described.

EXAMPLE 1

Figure 1:
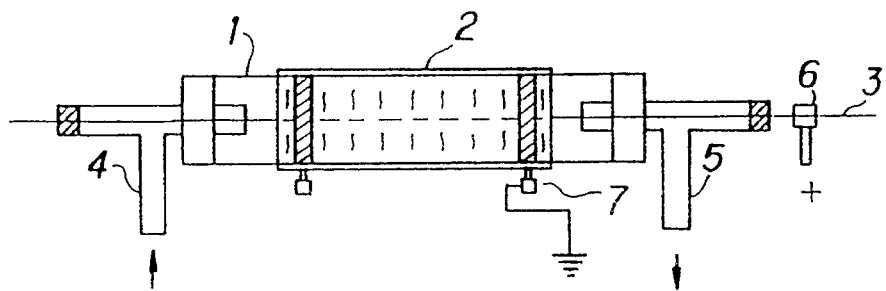
FIG. 1 is a schematic view showing an atmospheric pressure plasma generation apparatus used in the present invention.
Figure 2:
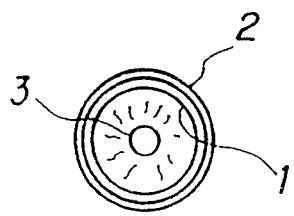
FIG. 2 is a schematic vertical cross sectional view showing the atmospheric pressure plasma generation apparatus shown in FIG. 1.
Figure 3:
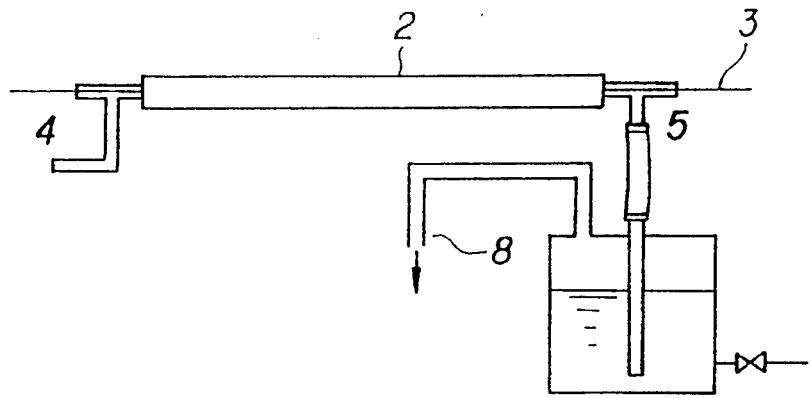
FIG. 3 is a schematic view for explaining the treatment method according to the present invention.
Figure 4:
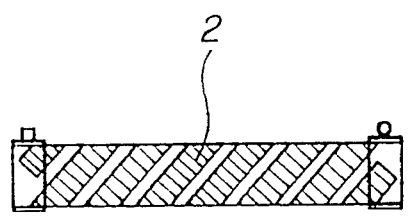
FIG. 4 is a schematic side view showing an example of electrode used in the present invention.
Figure 5:
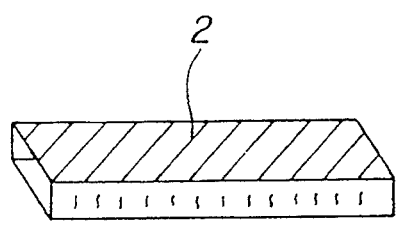
FIG. 5 is a schematic perspective view showing another example of atmospheric pressure plasma generation apparatus used in the present invention.

A low-boiling CFC solvent for device cleaning was placed in a gas washing bottle, helium was passed through the bottle to produce a mixture of vapor of the CFC solvent and helium, and the mixture was introduced into the cylinder from the T-formed tube 4. In this case, the chlorine-containing CFC compound of about 10% by volume was mixed with helium, which was immediately decomposed to hydrogen chloride and hydrogen fluoride which are quite harmless to the ozone layer. The effluent gas was introduced into water contained in a decomposition product absorption vessel as shown in FIG. 3 to convert the hydrogen chloride and hydrogen fluoride to hydrochloric acid and hydrofluoric acid, respectively. The pit value of the water changed from 7 to 1–2 immediately after passing the effluent gas through the water, showing an acidic nature.

When a glass rod with ammonia water was brought closer to the effluent gas, white smoke of ammonium chloride was generated, showing the presence of hydrogen chloride resulting from decomposition of the CFC.

Although the decomposition rate depends upon the gas flow rate and speed through the cylinder, the apparatus used in the above embodiment had a length of discharge portion of 500 mm and an inner diameter of glass cylinder of 16 mm, when the CFC/helium mixture containing 10% CFC was passed at a rate of 5 liters/min, the decomposition rate was about 34% and, for a rate of 2 liters/min, the decomposition rate was greater than 60%, showing the high effectiveness of the present treatment method.

Table 1 shows gas chromatographic charts of untreated and treated CFC-mixed helium and plasma-treated CFC-mixed helium.

The sample gas for gas chromatography was sampled at the outlet of the plasma treatment tube (e.g. 5 in FIG. 3).

TABLE 1

| PKNO | TIME | AREA | MK | IDONO | CONC |
|---|---|---|---|---|---|
| | | Untreated | | | |
| 1 | 0.05 | 230 | | | 0.0242 |
| 2 | 0.442 | 948423 | V | | 99.9758 |
| TOTAL | | 948653 | | | 100 |
| | | Treated | | | |
| 1 | 0.442 | 605290 | | | 97.3399 |
| 2 | 0.525 | 16026 | V | | 2.5772 |
| 3 | 0.808 | 516 | V | | 0.0829 |
| TOTAL | | 621831 | | | 100 |

Furthermore, as shown in FIG. 3, after hydrogen chloride and hydrogen fluoride as decomposition products are removed, helium can be dried from the tube 8 for reuse at a very low running cost.

EXAMPLE 2

Helium was mixed with 1,1,1-trichloroethane, and treated at a flow rate of 5 liters/min in the same CFC decomposition apparatus as above. As a result, the decomposition rate was about 26%. Similarly, when 1,1,1-trichloroethane was mixed with argon and treated at a flow rate of 3 liters/min, the decomposition rate was as high as nearly 75%. This is shown in Table 2.

TABLE 2

| PKNO | TIME | AREA | MK | IDONO | CONC |
|---|---|---|---|---|---|
| | | Untreated | | | |
| 1 | 0.72 | 189 | | | 0.025 |
| 2 | 1.098 | 1957 | V | | 0.2584 |
| 3 | 1.933 | 10168 | V | | 1.3427 |
| 4 | 2.372 | 744955 | V | | 98.374 |
| TOTAL | | 757269 | | | 100 |
| | | Treated | | | |
| 1 | 0.125 | 2062 | | | 0.971 |
| 2 | 0.467 | 3808 | V | | 1.7938 |
| 3 | 0.672 | 540 | | | 0.2546 |
| 4 | 1.075 | 416 | | | 0.1958 |
| 5 | 1.758 | 183 | | | 0.0864 |
| 6 | 2.357 | 205134 | V | | 96.6237 |
| 7 | 4.525 | 158 | | | 0.0747 |
| TOTAL | | 212302 | | | 100 |

Furthermore, when argon was not dried to contain water and treated similarly, the decomposition rate was even further improved to 80%. This is shown in Table 3.

TABLE 3

| PKNO | TIME | AREA | MK | IDONO | CONC |
|---|---|---|---|---|---|
| | | Untreated | | | |
| 1 | 0.282 | 2575 | | | 0.3221 |
| 2 | 0.683 | 538 | V | | 0.0673 |
| 3 | 1.082 | 234 | | | 0.0293 |
| 4 | 2.362 | 796045 | | | 98.5813 |
| TOTAL | | 799392 | | | 100 |
| | | Treated | | | |
| 1 | 0.473 | 3454 | | | 1.4863 |
| 2 | 0.557 | 347 | V | | 0.1493 |
| 3 | 0.692 | 657 | V | | 0.2827 |
| 4 | 1.1 | 350 | | | 0.1508 |
| 5 | 1.758 | 1638 | | | 0.7051 |
| 6 | 2.378 | 225644 | V | | 97.1011 |
| 7 | 4.582 | 290 | | | 0.1248 |
| TOTAL | | 232380 | | | 100 |

As described above, the present invention is to decompose CFC compounds to be harmless by an atmospheric pressure plasma, without requiring an expensive plasma generation apparatus as used in prior art methods, and can easily decompose CFC compounds rising a very simple apparatus, with improved effect.

What is claimed is:

1. A method for treating ozone layer depleting substances comprising introducing helium, argon, a mixture of helium and argon or a gaseous mixture of argon and a ketone at a pressure of from about 500 torr to about atmospheric pressure into a plasma reactor comprising opposing electrodes and a solid dielectric interposed between said opposing electrodes and disposed on a surface of at least one of said opposing electrodes, thereby forming a gaseous atmosphere at a pressure of from about 500 torr to about atmospheric pressure within said plasma reactor, generating an atmospheric pressure glow discharge in the gaseous atmosphere, introducing gaseous ozone layer depleting substances into the glow discharge to decompose the substances, and absorbing resulting decomposition products in water.

2. The method according to claim 1 which comprises generating the atmospheric pressure glow discharge by applying a frequency in the range of from 200 Hz to 50 KHz between the opposing electrodes.

3. The method according to claim 2 wherein the atmospheric pressure glow discharge is generated by applying a frequency in the range of from 3 KHz to 10 KHz between the opposing electrodes.

4. The method according to claim 2 wherein the atmospheric pressure glow discharge is generated by applying a voltage of from 1,000 to 8,000 V across the opposing electrodes.

5. The method according to claim 1 wherein the ozone layer depleting substance comprises trichloroethane, said method comprising treating the trichloroethane in the gaseous atmosphere of argon to form a water-soluble decomposition product.

6. The method according to claim 5 wherein the volume of trichloroethane treated is 15% based on the total volume of argon.

7. The method of claim 1 wherein the ozone layer depleting substances comprise chlorofluorocarbon.

8. A method for decomposing gaseous chlorofluorocarbon or low-boiling chlorofluorocarbon solvent which comprises creating an atmospheric pressure glow discharge in a plasma reactor containing a gaseous material selected from the group consisting of argon, helium, a mixture of argon and helium, and a mixture of argon and acetone at substantially atmospheric pressure, introducing the gaseous chlorofluorocarbon or low-boiling chlorofluorocarbon solvent vapor into the plasma reactor containing the atmospheric pressure glow discharge to decompose the chlorofluorocarbon gas or vapor, and absorbing the resulting decomposition products in water.

9. The method of claim 8 which comprises introducing the chlorofluorocarbon gas or vapor into the atmospheric pressure glow discharge-containing plasma reactor as a mixture with said gaseous material.

10. The method of claim 9 wherein the step of creating an atmospheric pressure glow discharge comprises applying a voltage of from about 1,000 to about 8,000 volts at a frequency of from about 200 Hz to about 50 KHz to opposing electrodes within said gaseous material containing plasma reactor and separated by a solid dielectric provided on a surface of one of said opposing electrodes.

* * * * *